April 9, 1968 H. C. PAULSEN 3,377,466
APPARATUS FOR HANDLING THERMOPLASTIC MATERIAL
Filed April 5, 1965 4 Sheets-Sheet 1

Inventor
Hans C. Paulsen
By his Attorney
Ernest D. Litchfield

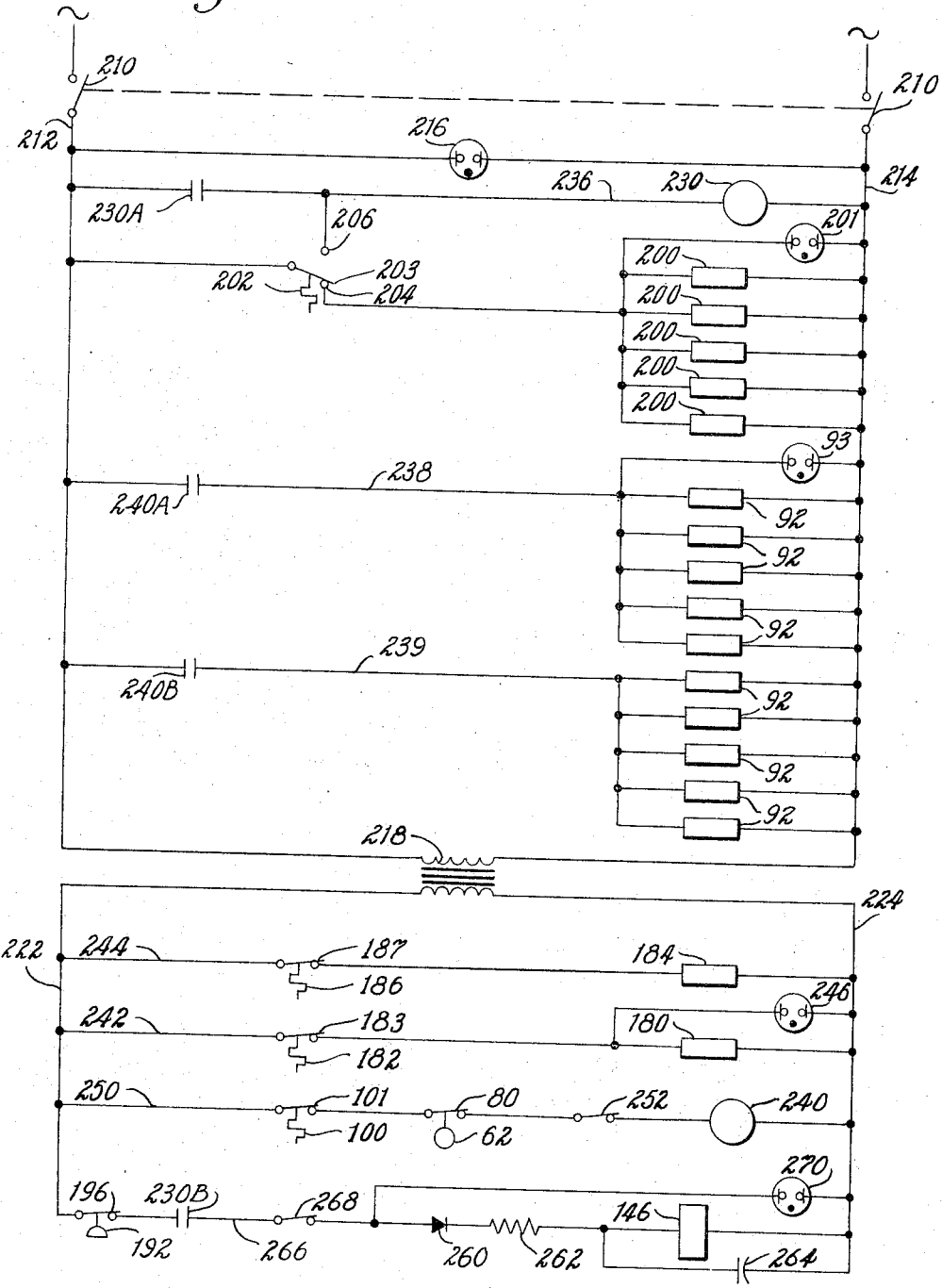

United States Patent Office 3,377,466
Patented Apr. 9, 1968

3,377,466
APPARATUS FOR HANDLING THERMO-
PLASTIC MATERIAL
Hans C. Paulsen, Lexington, Mass., assignor to United
Shoe Machinery Corporation, Boston, Mass., a corporation of New Jersey
Filed Apr. 5, 1965, Ser. No. 445,430
9 Claims. (Cl. 219—421)

ABSTRACT OF THE DISCLOSURE

Apparatus for melting and dispensing thermoplastic material includes a housing formed of insulating material having in its lower portion an open-topped heating container for receiving the molten material, a supply hopper mounted in the upper part of the housing and a melting grid located in the housing below the hopper and spaced directly above the storage container, means for heating the grid controlled in accordance with changes in the level of the molten material in the container and means interposed between the container and the grid for insulating the grid from heat tending to rise from the heated container and from the molten material therein.

This invention relates to apparatus for handling thermoplastic material and has for its object the provision of a novel and improved apparatus for melting solid thermoplastic material and dispensing it in molten condition which is of relatively simple and inexpensive construction and yet especially efficient and dependable in operation.

With the above object in view, there is provided a housing construction formed of heat insulating material, an open topped container located in the lower part of the housing and provided with heating means, a supply hopper mounted in the upper part of the housing for receiving the solid thermoplastic material and a grid for melting solid thermoplastic material located within the housing below the hopper and spaced above the container, together with means for heating the grid to cause solid thermoplastic material supplied thereto from the hopper to melt and to flow by gravity into the container, means for controlling the action of the grid heating means in accordance with changes in the level of the molten material in the container and means for withdrawing molten from the container and delivering it to a point of use. More particularly, electrical means inserted directly in the grid are provided for heating the grid and the means for controlling the action of the heating means includes a float member resting on the molten material within the container. In order better to regulate the action of the grid in melting the solid thermoplastic material, in the herein illustrated apparatus, means are associated with the housing and interposed between the open top of the container and the grid for insulating the grid from heat rising from the heated container and from the molten material therein which would tend to continue the melting action of the grid even after the supply of electrical energy to the heating means had been shut off. More particularly, this means comprises a partition member formed of heat insulating material and having openings therein and a funnel-like baffle member extending from the lower side of the grid to said openings for directing molten material from the grid through the openings and into the open top of the container and exposed to the atmosphere to facilitate cooling of the grid.

With this improved arrangement, due to the insulating character of the housing only that portion of the solid thermoplastic material which rests on the grid is exposed to the melting action of the grid and inasmuch as the grid is effectively insulated from the heat rising from the heated container and from the body of molten material in the container, by the partition member and also by the baffle member, and cools quite rapidly, a very quick response is obtained both for the beginning of the melting action, when the level of molten material in the container drops as molten material is withdrawn therefrom and delivered to a point of use, and for the discontinuance of the melting action, when the level of molten material in the container has risen to the desired point, as a result of the flow of molten material from the grid and into the container. In addition, by inserting the heating elements within the grid construction itself the effectiveness of the grid is greatly improved inasmuch as the heat from the heating elements is almost immediately available for melting the thermoplastic material. Moreover, by enclosing the melting grid and the heated storage container within a housing formed of heat insulating material the overall efficiency of the apparatus is enhanced and at the same time heating of the surrounding atmosphere is minimized and the danger of accidental burns is avoided.

The above and other objects and features of the invention will appear in the following detailed description of the preferred embodiment which is illustrated in the accompanying drawings, and will be pointed out in the claims.

In the drawings:

FIG. 4 is a detail view of a modification; and

FIG. 5 is an electrical diagram.

Figure 1:
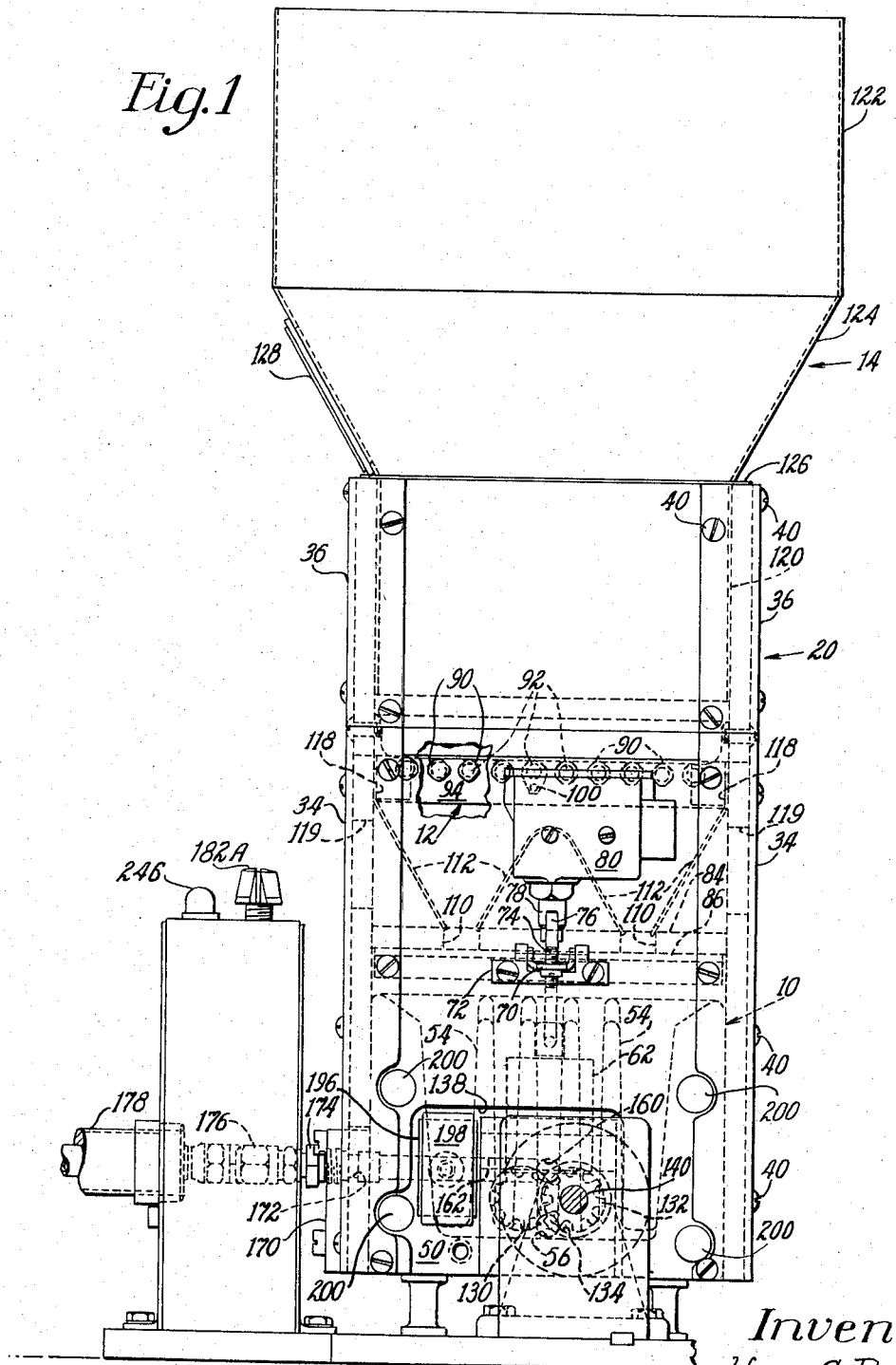
FIG. 1 is a view in front elevation of apparatus for melting and dispensing thermoplastic material embodying the features of this invention.

Referring to these drawings, the apparatus which is disclosed therein comprises a lower storage container indicated generally by the reference character 10, a melting grid, indicated generally by the reference character 12 and a supply hopper, indicated generally by the reference character 14, see FIG. 1. These several components are associated with a housing construction, indicated generally by the reference character 20 and comprising side panels 22, 22, a rear panel 24, two front panels 26, 28 and a cover panel 30. These panels are formed of a suitable heat insulating material and are secured in assembled relation by means of a plurality of angle irons 32, 32, 34, 34 and 36, 36 and screws 40, 40.

Figure 2:
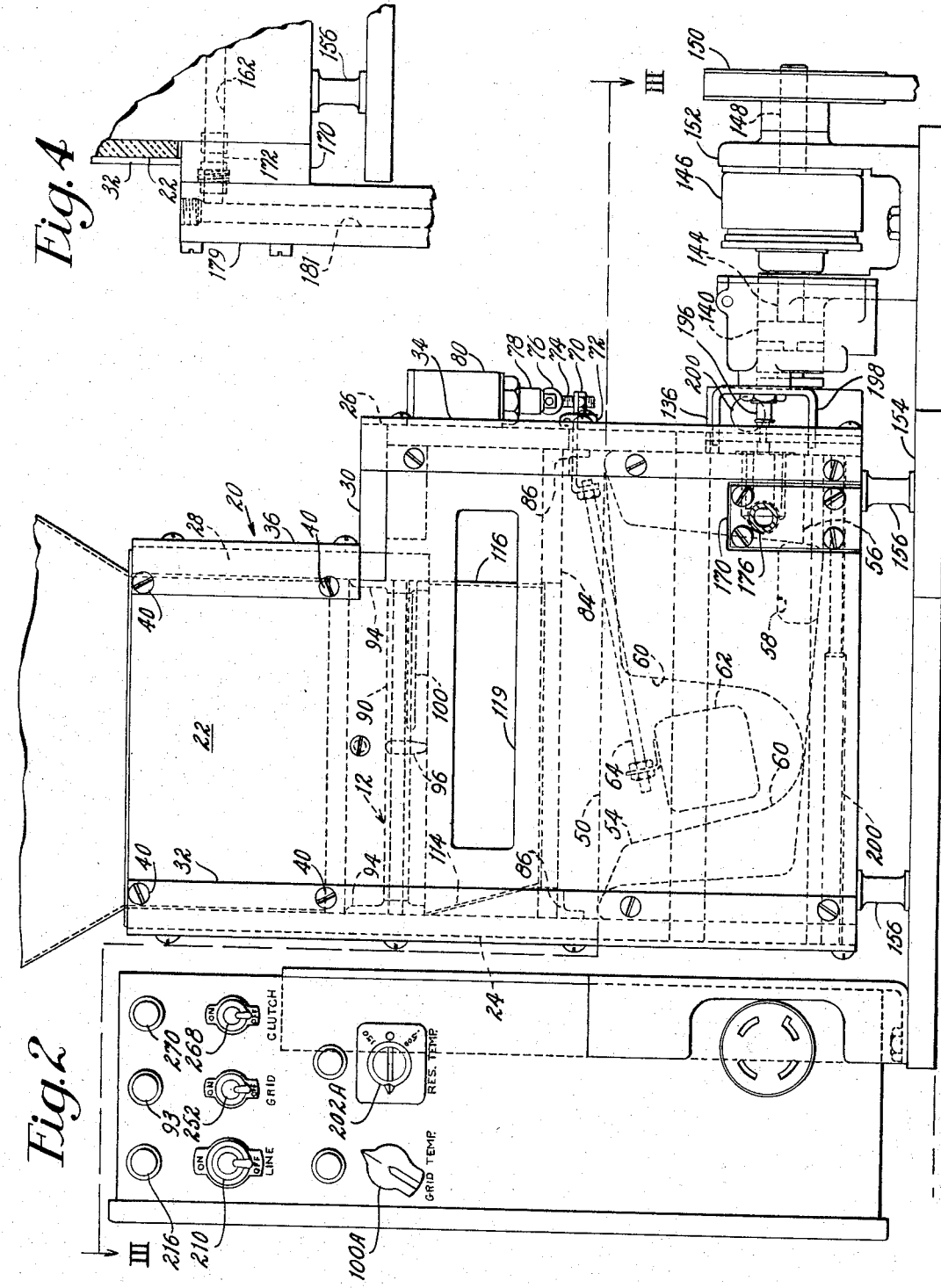
FIG. 2 is a view in side elevation of the apparatus shown in FIG. 1.

The storage container 10 comprises a generally rectangular block 50 of a suitable heat conducting material, e.g. cast iron or aluminum, and is secured in the lower part of the housing 20 by certain of the screws 40, 40 which extend through the angle irons and panels of insulating material and into this block. The block 50 is formed with a plurality of chambers 52, 52 by means of web portions 54, 54, FIG. 3, and these chambers are in communication with each other and with an outlet passage 56, FIG. 1, through apertures 58, 58 in these web portions see FIGS. 2 and 3. The two central web portions are cut away at 60, as indicated in FIG. 2 to provide a clearance space for a float member 62 which is carried on one end of an arm 64. This arm is secured to a lever 70 which is pivotally mounted on a bracket 72 secured to the front panel 26, FIG. 1, and carries an adjustable abutment screw 74 adapted to engage a roll 76 on the plunger 78 of a microswitch 80. Directly above the storage container 10, a sheet of insulating material 84 extends entirely across the inside of the housing 20 and is supported on brackets 86, 86, FIGS. 1 and 2. This sheet of material forms a partition which serves as a heat barrier insulating the melting grid 12 from heat rising from molten thermoplastic material in the chambers 52, 52 of the block 50.

The grid 12 comprises a casting of suitable material, for example cast iron or aluminum, of the configuration shown in FIGS. 1 and 2 of the drawings and includes a plurality of spaced-apart cross members 90, 90 extending between side portions 94 and joined by a central web 96. As is shown in FIGS. 1 and 2, this grid is secured to the rear and side panels 24, 22, 22 and to the lower edge of the upper front panel 28 and is spaced above the sheet of insulating material 84. Each cross member 90 of the grid is bored out to receive an electrical heater 92 and, in addition, the middle cross member has inserted therein a thermostat, or similar electrical control device, 100.

Extending between the lower side of the grid 12 and two spaced-apart elongated openings 110, 110 in the sheet of insulating material 84, FIG. 1, is a sheet metal baffle member 112 which serves to direct molten material flowing from the grid 12 through the mentioned openings and thence into the storage container 10. As can be seen in FIG. 2, the baffle member 112 has closed ends 114, 116 and serves as a double funnel, FIG. 1. Thus, the molten material is deposited in the chambers 52, 52 of the storage container on the opposite sides of the float member 62 without falling directly thereon. The baffle member has flanges 118, 118, FIG. 1, that are in metal-to-metal contact with the grid, and serve to aid in cooling the grid. This action of the baffle member is facilitated by the provision of openings 119 in the panels 22 thus exposing the baffle member to the cooling effect of the outside atmosphere.

The supply hopper 14 is also fabricated out of sheet metal and is of the shape shown in FIG. 1 having a lower portion 120 adapted to fit into the upper part of the housing construction 20 and an upper portion 122 of somewhat larger cross section joined together by an intermediate flared portion 124. A flange 126 secured to the supply hopper adjacent to the lower part of the flared portion rests on the upper edge of the housing 20. The lower portion 120 fits nicely into the upper part of the housing so that the supply hopper can be readily lifted out, when desired. Preferably, an observation window 128 made of suitable material, e.g. Plexiglas, is provided on one wall of the flared portion 124 so that an operator may observe when the supply of bulk thermoplastic material should be replenished.

The outlet passage 56, FIGS. 1 and 2, leads to the inlet side of a pump comprising two intermeshing gears 130, 132 received within a recess formed in one side of a block 136. This block is secured to one end of the block 50 of the storage container 10 and projects through an opening 138 formed in the front panel 26 of the housing construction 20, FIG. 1. The gear 132 is mounted on a drive shaft 140 which is connected, through a coupling 142, to the output shaft 144 of an electromagnetic clutch 146 having an input shaft 148 carrying a drive pulley 150, FIGS. 2 and 3. The shafts 144 and 148 are journaled in a bearing bracket 152 which, together with the housing 20, is supported on a base plate 154, the housing being mounted on piller posts 156, 156 to afford free circulation of air beneath the bottom of the block 50 of the storage container 10.

Figure 3:
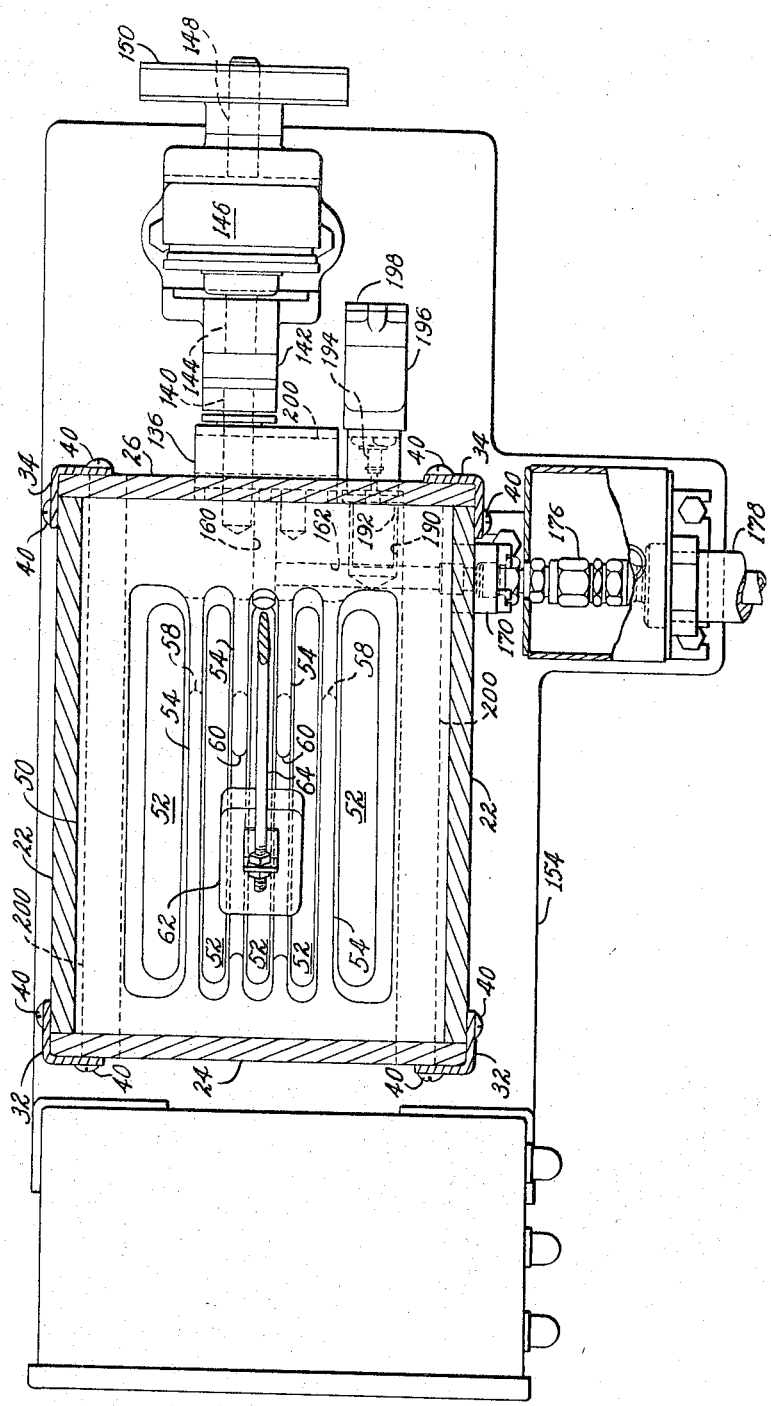
FIG. 3 is a plan view of the apparatus with certain parts shown in horizontal section substantially on line III—III of FIG. 2 and looking in the direction of the arrows.

Leading from the discharge side of the gear pump is a passage 160, formed in the block 50, and this passage is in communication with an outlet passage 162 also formed in the block 50, extending at right angles to the passage 160 and leading to the outside of the block 50, FIG. 3. Secured to this side of the block is a smaller block 170 having a bore 172 in alignment with the passage 162 and threaded into one end of this bore is a thimble 174 which forms a part of a connector 176 associated with one end of a hose 178, FIG. 1. This hose is of a conventional type and includes in its construction an electrical heating element, diagrammatically illustrated in FIG. 5 and identified by reference character 180 together with a thermostat 182 adapted to control a single throw switch 183. At its delivery end, this hose will be provided with a nozzle member, not shown, but fitted with an electrical heater 184 and a thermostat 186 for controlling a single throw switch 187 as diagrammatically illustrated in FIG. 5. As shown in the modification illustrated in FIG. 4, the nozzle may be carried at the lower end of a rigid arm 179, secured to the block 170 and provided with a passage 181.

Opening into the passage 162 is a pressure chamber 190, FIG. 3, which contains a Sylphon bellows member 192 adapted to actuate the plunger 194 of a microswitch 196 when pressure in the passage 162 reaches a predetermined value. This microswitch is mounted in a bracket 198 which is secured to the block 50 and which projects outwardly through the opening 138 in the front panel member 26. Associated with the storage container block 50 and gear pump block 136 are a plurality of electric heaters 200, 200 and a signal light 201 under the control of a thermostat 202 adapted to control a double throw switch 203, having contacts 204 and 206 as diagrammatically illustrated in FIG. 5.

Referring to FIG. 5, a main switch 210 controls the flow of electrical energy from a suitable alternating current source to two high voltage lines 212, 214 as well as to an indicator light 216, see also FIG. 2, and to the input side of a step-down transformer 218, which in turn, feeds two lower voltage lines 222, 224. The coil of a relay 230 and one of its normally open contacts 230A are connected across lines 212, 214 by a line 236 while the grid heaters 92, 92, and a signal light 93 are connected across these lines by lines 238 and 239, respectively, in which are interposed the two normally open contacts 240A and 240B of a relay having a coil 240. As shown, the heaters 180 and 184 of the hose 178 and its nozzle, not shown, are connected across the low voltage lines 222, 224 by lines 242, 244, respectively, in which the thermostatically controlled switches 183 and 187 are interposed. Associated with the heater 180 is a signal light 246. The relay coil 240 is in a line 250, connected between lines 222, 224 and in which there are interposed the thermostatically controlled switch 101, the float control switch 80 and a manually operable switch 252. Direct current for energizing the clutch 146 is provided by a rectifier circuit including rectifier 260, coil 262 and capacitor 264 connected across the lines 222, 224 by means of a line 266 in which there are interposed the pressure switch 196, the other open contact 230B of relay coil 230 and a manually operable switch 268, see also FIG. 2. As shown, a signal light 270 is also interposed in this line.

In using the apparatus which has been described above, the supply hopper 14 will be filled with solid thermoplastic material in granular or pellet form, preferably of a size too great to pass through the spaces between the cross members 90, 90 at the grid 12, or, if desired a solid block of material may be placed in the hopper directly on the grid 12, and the switches 210, 252 and 268 will be closed manually. Heaters 92, 92 associated with the grid 12; 200, 200, associated with the block 50 of the storage container 10, and 180 and 184, associated with the hose and nozzle, will now be energized and molten thermoplastic material will soon flow downwardly from the grid, through the funnel-like baffle member 112, openings 110, 110 in the partition member 84 into the chambers 52, 52 in the block 50 of the storage container 10. The temperature of the grid 12 is controlled by the thermostat 100, which operates the switch 101 to energize and de-energize the relay coil 240, thereby closing and opening relay contacts 240A and 240B. Similarly, the thermostat 202 will control the temperature of the storage container block 50 and the pump block 136 by means of the switch 203, initially on contact 204 as shown in FIG. 5. When the temperature of these parts rises to the predetermined value, switch 203 moves to contact 206, de-energizing heaters 200, 200 and at the same time energizing the relay coil 230 to complete the circuit to the pump clutch 146. If, as suggested above, switch 268 is closed, the pump will now start to deliver molten thermoplastic material through the hose 178 and its associated nozzle to a point of use.

The capacity of the grid 12 is somewhat greater than the output of the gear pump so that the level of molten material within the storage container 10 will gradually rise and elevate the float 62 until the switch 80 is opened thus de-energizing the relay coil 240 and opening contacts 240A and 240B. With the heaters 92, 92 thus de-energized, the grid 12 will cool rather quickly due to its relatively small mass and heat storage capacity and also because of the manner in which it is insulated from the heated storage container block 50, and the heated molten material therein, by the action of the partition member 84 of insulating material and the effect of the baffle 112. The cooling of the grid is further facilitated by the radiating action of the baffle member 112 which, due to the openings 119, 119, is exposed to the outside atmosphere and cools quite quickly. In addition, very little, if any, heat is conducted from the storage container block 50 upwardly to the grid through the panels 22, 22, 24, 26 and 28 of the housing construction which are made of insulating material. As the pump continues to withdraw molten material from the chambers 52, 52 of the storage container block 50, the level of molten material will gradually be lowered until the switch 80 closes and the grid 12 is again energized so that the above melting cycle is repeated.

Instead of being closed manually and left closed to provide a continuous delivery of molten material, the switch 268 may be actuated intermittently, for example from a signal obtained from an outside source such as articles travelling along a conveyor, to provide an intermittent operation of the gear pump. Under such conditions, the rate at which molten material is withdrawn from the storage container will vary as the frequency and/or length of each period of pump operation increases or decreases and the frequency at which the grid heating elements are energized and de-energized will vary accordingly. However, due to the minimum heat storage characteristics of the grid and the manner in which it is insulated from heat rising from the storage container, the response of the system is quite rapid and such as to accommodate widely varying operating conditions. In addition, the molten material in the container 10 is substantially isolated from the outside atmosphere by the partition 84 and baffle 112, so that deterioration is reduced to a minimum.

Preferably, and as shown, the thermostats 100 and 202 are adjustable, by means of hand knobs 100A and 202A, FIG. 2, for varying the temperature of the grid and storage container respectively. The pressure switch 196, and Sylphon bellows 192 which is in communication with the passage 162, serves as a safety device for opening the circuit through line 266 to de-energize the clutch 146 when the pressure in this passage builds up to a predetermined upper value. Also, this arrangement provides for a substantially constant output pressure at the delivery nozzle.

Having described the invention what is claimed as new and desired to secure by United States Letters Patent is:

1. Apparatus for melting solid thermoplastic material and dispensing it in molten condition comprising a housing formed of heat insulating material, an open topped container for receiving and storing molten thermoplastic material mounted in the lower part of said housing, means for heating said container, a supply hopper mounted in the upper part of the housing for receiving solid thermoplastic material, a grid for melting solid thermoplastic material located within the housing below said hopper and spaced directly above said storage container, means for heating said grid to cause solid thermoplastic material supplied thereto from the hopper to melt and to flow by gravity into said storage container, means for controlling the action of said grid heating means in accordance with the level of molten material in the storage container, means associated with the housing construction and interposed between the container and said grid for insulating the grid from heat tending to rise from the heated container and molten material therein, and means for withdrawing molten material from the container and delivering it to a point of use.

2. Apparatus for melting solid thermoplastic material and dispensing it in molten condition comprising a housing formed of heat insulating material, an open topped container for receiving and storing molten thermoplastic material mounted in the lower part of said housing, means for heating said container, a supply hopper mounted in the upper part of the housing for receiving solid thermoplastic material, a grid for melting solid thermoplastic material located within the housing below said hopper and spaced directly above said storage container, electrical means within the grid for heating said grid to cause solid thermoplastic material supplied thereto from the hopper to melt and to flow by gravity into said storage container, means for controlling the action of said grid heating means in accordance with the level of molten material of the storage container, means associated with the housing construction and interposed between the storage container and said grid for insulating the grid from heat tending to rise from the heated container and molten material therein, and means for withdrawing molten material from the container and delivering it to a point of use.

3. Apparatus for melting solid thermoplastic material and dispensing it in molten condition comprising a housing formed of heat insulating material, an open topped container for receiving and storing molten thermoplastic material mounted in the lower part of said housing, means for heating said container, a supply hopper mounted in the upper part of the housing for receiving solid thermoplastic material, a grid for melting solid thermoplastic material located within the housing below said hopper and spaced directly above said storage container, electrical means inserted within the grid for heating the grid to cause solid thermoplastic material supplied thereto from the hopper to melt and to flow by gravity into said storage container, means including a float member for controlling the action of said grid heating means in accordance with the level of molten material in the storage container, and means associated with the housing construction and interposed between the container and said grid for insulating the grid from heat tending to rise from the heated container and molten material therein, and means for withdrawing molten material from the container and delivering it to a point of use.

4. Apparatus for melting solid thermoplastic material and dispensing it in molten condition comprising a housing formed of heat insulating material, an open topped container for receiving and storing molten thermoplastic material mounted in the lower part of said housing, means for heating said container, a supply hopper mounted in the upper part of the housing for receiving solid thermoplastic material, a grid for melting solid thermoplastic material located within the housing below said hopper and spaced directly above said storage container, means for heating said grid to cause solid thermoplastic material supplied thereto from the hopper to melt and to flow by gravity into said storage container, means for controlling the action of said grid heating means in accordance with the level of molten material in the storage container, means associated with the housing construction and including a member formed of heat insulating material having openings therein interposed between the container and said grid for insulating the grid from heat tending to rise from the heated container and molten material therein, and means for withdrawing molten material from the container and delivering it to a point of use.

5. Apparatus for melting solid thermoplastic material and dispensing it in molten condition comprising a housing formed of heat insulating material, an open topped container for receiving and storing molten thermoplastic material mounted in the lower part of said housing, means for heating said container, a supply hopper mounted in the upper part of the housing for receiving solid thermoplastic material, a grid for melting solid thermoplastic material located within the housing below said hopper and spaced directly above said storage container, means for heating said grid to cause solid thermoplastic material supplied thereto from the hopper to melt and to flow by gravity into said storage container, means for controlling the action of said grid heating means in accordance with the level of molten material in the storage container, means associated with the housing construction and including a member formed of heat insulating material having openings therein interposed between the storage container and said grid and a baffle member extending from the lower side of the grid to said openings, for insulating the grid from heat tending to rise from the heated container and molten material, and means for withdrawing molten material from the container and delivering it to a point of use.

6. Apparatus for melting solid thermoplastic material and dispensing it in molten condition comprising a housing formed of heat insulating material, an open topped container for receiving and storing molten thermoplastic material mounted in the lower part of said housing, means for heating said container, a supply hopper mounted in the upper part of the housing for receiving solid thermoplastic material, a grid for melting solid thermoplastic material located within the housing below said hopper and spaced directly above said storage container, means for heating said grid to cause solid thermoplastic material supplied thereto from the hopper to melt and to flow by gravity into said storage container, means for controlling the action of said grid heating means in accordance with the level of molten material in the storage container, means associated with the housing construction and including a member formed of heat insulating material having openings therein interposed between the storage container and said grid and a baffle member extending from the lower side of the grid to said openings, for insulating the grid from heat tending to rise from the heated container and molten material therein, said housing being provided with openings to expose said baffle member to the outside atmosphere to facilitate cooling of the grid, and means for withdrawing molten material from the container and delivering it to a point of use.

7. Apparatus for melting solid thermoplastic material and dispensing it in molten condition comprising a housing formed of heat insulating material, an open topped container for receiving and storing molten thermoplastic material mounted in the lower part of said housing, means for heating said container, a supply hopper mounted in the upper part of the housing for receiving solid thermoplastic material, a grid for melting solid thermoplastic material located within the housing below said hopper and spaced directly above said storage container, electrical means inserted within the grid for heating the grid to cause solid thermoplastic material supplied thereto from the hopper to melt and to flow by gravity into said storage container, means including a float member for controlling the action of said grid heating means in accordance with the level of molten material in the storage container, means associated with the housing construction and including a member formed of heat insulating material and having openings therein interposed between the container and said grid for insulating the grid from heat tending to rise from the heated container and molten material therein, and means for withdrawing molten material from the container and delivering it to a point of use.

8. Apparatus for melting solid thermoplastic material and dispensing it in a molten condition comprising a housing formed of heat insulating material, an open topped container for receiving and storing molten thermoplastic material mounted in the lower part of said housing, means for heating said container, a supply hopper mounted in the upper part of the housing for receiving solid thermoplastic material, a grid for melting solid thermoplastic material located within the housing below said hopper and spaced directly above said storage container, electrical means inserted within the grid for heating the grid to cause solid thermoplastic material supplied thereto from the hopper to melt and to flow by gravity into said storage container, means including a float member for controlling the action of said grid heating means in accordance with the level of molten material in the storage container, means associated with the housing construction and comprising a member formed of heat insulating material and having openings therein interposed between the container and said grid and a baffle member extending from the lower side of the grid to said openings, for insulating the grid from heat tending to rise from the heated container and molten material therein, and means for withdrawing molten material from the container and delivering it to a point of use.

9. Apparatus for melting solid thermoplastic material and dispensing it in molten condition comprising a housing formed of heat insulating material, an open topped container for receiving and storing molten thermoplastic material mounted in the lower part of said housing, means for heating said container, a supply hopper mounted in the upper part of the housing for receiving solid thermoplastic material, a grid for melting solid thermoplastic material located within the housing below said hopper and spaced directly above said storage container, electrical means inserted within the grid for heating the grid to cause solid thermoplastic material supplied thereto from the hopper to melt and to flow by gravity into said storage container, means including a float member for controlling the action of said grid heating means in accordance with the level of molten material in the storage container, means associated with the housing construction and comprising a member formed of heat insulating material and having openings therein interposed between the container and said grid and a baffle member extending from the lower side of the grid to said openings, for insulating the grid from heat tending to rise from the heated container and molten material therein, said housing being provided with openings to expose said baffle memebr to the outside atmosphere to facilitate cooling of the grid, and means for withdrawing molten material from the container and delivering it to a point of use.

References Cited

UNITED STATES PATENTS

| | | | |
|---|---|---|---|
| 2,217,743 | 10/1940 | Greenewalt | 18—8 |
| 2,337,042 | 12/1943 | Gloss | 13—33 X |
| 2,464,013 | 3/1949 | Willis | 219—333 X |
| 2,809,772 | 10/1957 | Weiss | 219—421 X |
| 3,041,048 | 6/1962 | Heijnis | 18—8 X |

FOREIGN PATENTS 783,522    9/1957    Great Britain.

RICHARD M. WOOD, *Primary Examiner.*

C. L. ALBRITTON, *Assistant Examiner.*